United States Patent
Dent et al.

(10) Patent No.: US 9,507,054 B2
(45) Date of Patent: Nov. 29, 2016

(54) COMPOSITION FOR FORMING AN ARTICLE HAVING EXCELLENT REFLECTANCE AND FLAME RETARDANT PROPERTIES AND ARTICLE FORMED THEREFROM

(71) Applicant: Dow Corning Corporation, Midland, MI (US)

(72) Inventors: Stanton James Dent, Midland, MI (US); Jacob William Steinbrecher, Midland, MI (US); Michael Raymond Strong, Midland, MI (US)

(73) Assignee: DOW CORNING CORPORATION, Midland, MI (US)

( * ) Notice: Subject to any disclaimer, the term of this patent is extended or adjusted under 35 U.S.C. 154(b) by 0 days.

(21) Appl. No.: 14/655,828

(22) PCT Filed: Dec. 19, 2013

(86) PCT No.: PCT/US2013/076648
§ 371 (c)(1),
(2) Date: Jun. 26, 2015

(87) PCT Pub. No.: WO2014/105645
PCT Pub. Date: Jul. 3, 2014

(65) Prior Publication Data
US 2015/0362628 A1    Dec. 17, 2015

Related U.S. Application Data

(60) Provisional application No. 61/746,262, filed on Dec. 27, 2012.

(51) Int. Cl.
| | | |
|---|---|---|
| C08K 3/22 | (2006.01) | |
| G02B 1/04 | (2006.01) | |
| G02B 5/08 | (2006.01) | |
| C08K 3/00 | (2006.01) | |
| C08K 5/54 | (2006.01) | |
| C08K 5/56 | (2006.01) | |
| C08G 77/12 | (2006.01) | |
| C08G 77/20 | (2006.01) | |

(52) U.S. Cl.
CPC ............. G02B 1/04 (2013.01); C08K 3/0058 (2013.01); C08K 3/22 (2013.01); C08K 5/5403 (2013.01); C08K 5/56 (2013.01); G02B 5/08 (2013.01); C08G 77/12 (2013.01); C08G 77/20 (2013.01); C08K 2003/2224 (2013.01); C08K 2003/2227 (2013.01); C08K 2003/2237 (2013.01); C08K 2003/2241 (2013.01)

(58) Field of Classification Search
None
See application file for complete search history.

(56) References Cited

U.S. PATENT DOCUMENTS

| | | | |
|---|---|---|---|
| 3,419,593 A | 12/1968 | Willing | |
| 4,087,585 A | 5/1978 | Schulz | |
| 4,203,886 A * | 5/1980 | Hirai ........................ | C08K 3/16 250/519.1 |
| 4,631,299 A * | 12/1986 | Laisney .................... | C08J 9/02 521/134 |
| 4,695,597 A * | 9/1987 | Seino ...................... | C08L 83/04 521/154 |
| 4,766,176 A | 8/1988 | Lee et al. | |
| 5,017,654 A | 5/1991 | Togashi et al. | |
| 5,082,886 A * | 1/1992 | Jeram ..................... | C08L 83/04 524/403 |
| 5,194,649 A | 3/1993 | Okawa | |
| 5,260,372 A * | 11/1993 | Toporcer .................. | C08K 3/04 524/785 |
| 5,466,512 A | 11/1995 | Babcock et al. | |
| 5,882,467 A | 3/1999 | Sierawski et al. | |
| 6,124,407 A | 9/2000 | Lee et al. | |
| 7,595,113 B2 | 9/2009 | Miyoshi | |
| 7,939,591 B2 | 5/2011 | Tomoda | |
| 8,012,381 B2 | 9/2011 | Taguchi et al. | |
| 8,013,056 B2 | 9/2011 | Taguchi et al. | |
| 8,022,137 B2 | 9/2011 | Taguchi et al. | |
| 8,071,697 B2 | 12/2011 | Frisch et al. | |
| 8,138,276 B2 | 3/2012 | Chao et al. | |
| 8,710,539 B2 | 4/2014 | Matsui et al. | |
| 2007/0208128 A1 | 9/2007 | Jung et al. | |
| 2007/0218293 A1 | 9/2007 | Kawato et al. | |
| 2008/0173889 A1 | 7/2008 | Shylo et al. | |
| 2009/0258216 A1 | 10/2009 | Yamakawa et al. | |
| 2009/0321770 A1 | 12/2009 | Ajiki et al. | |
| 2010/0065880 A1 | 3/2010 | Kashiwagi et al. | |
| 2012/0025240 A1 | 2/2012 | Lin | |
| 2012/0138997 A1 | 6/2012 | Tasaki et al. | |

FOREIGN PATENT DOCUMENTS

| | | |
|---|---|---|
| CN | 101735619 A | 6/2010 |
| DE | 197 40 631 A1 | 3/1999 |

(Continued)

OTHER PUBLICATIONS

International Search Report for Application No. PCT/US2013/076648 dated Mar. 13, 2014, 3 pages.
English language abstract and machine-assisted English translation for CN 101735619 extracted from espacenet.com database on Jul. 1, 2015, 19 pages.

(Continued)

*Primary Examiner* — Robert S Loewe
(74) *Attorney, Agent, or Firm* — Howard & Howard Attorneys PLLC

(57) ABSTRACT

A composition comprises (A) a silicone resin; (B) an organosilicon compound; (C) a hydrosilylation catalyst; and (D) a flame retardant component comprising aluminum hydroxide. The composition further comprises (E) a reflective component different from component (D) and comprising titanium dioxide. The composition forms articles having excellent physical properties, including reflectance, flame retardant properties, and self-extinguishing properties. An article formed from the composition and a method of forming a molded article are also provided.

22 Claims, No Drawings

(56) References Cited

FOREIGN PATENT DOCUMENTS

| EP | 2 551 929 A1 | 1/2013 |
|---|---|---|
| JP | 2010-263165 A | 11/2010 |
| JP | 2011-052115 A | 3/2011 |
| JP | 2011-054902 A | 3/2011 |
| JP | 2011-140550 A | 7/2011 |
| JP | 2012-037829 A | 2/2012 |
| KR | 10-2010-0030959 A | 3/2010 |
| WO | WO 2011/118109 A1 | 9/2011 |
| WO | WO 2012/078617 A1 | 6/2012 |

OTHER PUBLICATIONS

English language abstract and machine-assisted English translation for DE 197 40 631 extracted from espacenet.com database on Jul. 1, 2015, 16 pages.

English language abstract and machine-assisted English translation for JP 2010-263165 extracted from espacenet.com database on Jul. 1, 2015, 25 pages.

English language abstract and machine-assisted English translation for JP 2011-052115 extracted from espacenet.com database on Jul. 1, 2015, 33 pages.

English language abstract and machine-assisted English translation for JP 2011-054902 extracted from espacenet.com database on Jul. 1, 2015, 28 pages.

English language abstract and machine-assisted English translation for JP 2011-140550 extracted from espacenet.com database on Jul. 1, 2015, 32 pages.

English language abstract for JP 2012-037829 extracted from espacenet.com database on Jul. 1, 2015, 2 pages.

English language abstract and machine-assisted English translation for KR 10-2010-0030959 extracted from espacenet.com database on Jul. 1, 2015, 13 pages.

English language abstract for WO 2011/118109 extracted from espacenet.com database on Jul. 1, 2015, 2 pages.

\* cited by examiner

US 9,507,054 B2

COMPOSITION FOR FORMING AN ARTICLE HAVING EXCELLENT REFLECTANCE AND FLAME RETARDANT PROPERTIES AND ARTICLE FORMED THEREFROM

CROSS-REFERENCE TO RELATED APPLICATIONS

This application is the National Stage of International Patent Application No. PCT/US2013/076648, filed on Dec. 19, 2013, which claims priority to and all the advantages of U.S. Patent Application No. 61/746,262, filed on Dec. 27, 2012, the content of which is incorporated herein by reference.

FIELD OF THE INVENTION

The subject invention generally relates to a composition and, more particularly, to a composition for forming an article having excellent reflectance and flame retardant properties and to the article formed from the composition.

DESCRIPTION OF THE RELATED ART

Reflective articles are known in the art and are utilized in various applications and end uses. For example, many optical device applications rely upon reflective articles for guiding and/or reflecting light. One particular example of a reflective article for such optical device applications is polished aluminum, which is advantageously highly reflective and fire/flame resistant. However, metals are expensive, and methods of their shaping are time consuming and similarly expensive.

One attempt to minimize costs associated with reflective articles involves utilizing a polymeric material with sufficiently high loadings of reflective fillers. However, conventional reflective articles including such high loadings of reflective fillers generally burn prolifically when exposed to a flame, which is undesirable and which makes these conventional reflective articles unsuitable for many applications. Moreover, many polymeric materials do not possess requisite heat and UV properties necessitated by certain applications, and such polymeric materials are often difficult to mold or shape.

SUMMARY OF THE INVENTION

The subject invention provides a hydrosilylation-curable silicone composition for forming an article. The composition comprises (A) a silicone resin comprising $R^1SiO_{3/2}$ units and/or $SiO_{4/2}$ units in combination with $R^1_3SiO_{1/2}$ units and/or $R^1_2SiO_{2/2}$ units, wherein $R^1$ is independently a substituted or unsubstituted $C_1$ to $C_{10}$ hydrocarbyl group free of aliphatic unsaturation, an alkenyl group, or a hydrogen atom, with the proviso that the silicone resin (A) includes at least two silicon-bonded alkenyl groups or at least two silicon-bonded hydrogen atoms per molecule. The composition further comprises (B) an organosilicon compound having an average of at least two silicon-bonded hydrogen atoms or at least two silicon-bonded alkenyl groups per molecule. When the silicone resin (A) includes silicon-bonded alkenyl groups, the organosilicon compound (B) includes at least two silicon-bonded hydrogen atoms per molecule, and when the silicone resin (A) includes silicon-bonded hydrogen atoms, the organosilicon compound (B) includes at least two silicon-bonded alkenyl groups per molecule. The composition also comprises (C) a hydrosilylation catalyst. Further, the composition comprises (D) a flame retardant component comprising aluminum hydroxide in an amount to provide at least 15 parts by weight of the aluminum hydroxide in the composition based on 100 parts by weight of the composition. Finally, the composition comprises (E) a reflective component different from component (D) and comprising titanium dioxide in an amount to provide no more than 15 parts by weight of the titanium dioxide in the composition based on 100 parts by weight of the composition.

In addition, the subject invention provides a method of forming a molded article with the composition. The method comprises disposing the composition into a mold and curing the composition in the mold to form the molded article.

The subject invention also provides an article formed from the composition and a molded article formed in accordance with the method.

DETAILED DESCRIPTION OF THE INVENTION

The subject invention provides a hydrosilylation-curable silicone composition for forming an article. The article formed from the composition has excellent physical properties, including flame retardance and reflectance. Accordingly, the article formed from the composition is suitable for many end uses and applications, such as in optical devices and applications relating thereto, as described below.

The composition comprises (A) a silicone resin. The silicone resin (A) comprises $R^1SiO_{3/2}$ units and/or $SiO_{4/2}$ units in combination with $R^1_3SiO_{1/2}$ units and/or $R^1_2SiO_{2/2}$ units, wherein $R^1$ is independently a substituted or unsubstituted $C_1$ to $C_{10}$ hydrocarbyl group free of aliphatic unsaturation, an alkenyl group, or a hydrogen atom. As readily understood in the art, $R^1_3SiO_{1/2}$ units are M units, $R^1_2SiO_{2/2}$ units are D units, $R^1SiO_{3/2}$ units are T units, and $SiO_{4/2}$ units are Q units, and a silicone resin is shown by the combination of the single-letter abbreviations of siloxy units of the silicone resin. For example, if a silicone resin consists of M units and D units, the resin is expressed as an MD resin. Accordingly, the silicone resin (A) may be a DT resin, an MT resin, an MDT resin, a DTQ resin, and MTQ resin, and MDTQ resin, a DQ resin, an MQ resin, a DTQ resin, an MTQ resin, or an MDQ resin. Two or more different types of silicone resins may be utilized in combination with one another in the silicone resin (A) of the composition. In certain embodiments, the silicone resin (A) comprises an MQ resin. In these embodiments, the molar ratio of M units to Q units in the MQ resin may vary based on the desired physical properties of the silicone resin (A). As used herein, the term "free of aliphatic unsaturation" means the substituted or unsubstituted $C_1$ to $C_{10}$ hydrocarbyl group does not contain an aliphatic carbon-carbon double bond or carbon-carbon triple bond (although $R^1$ may be an alkenyl group, which does include aliphatic unsaturation).

The silicone resin (A) includes at least two silicon-bonded alkenyl groups or at least two silicon-bonded hydrogen atoms per molecule. Generally, the silicone resin (A) does not include both silicon-bonded alkenyl groups and silicon-bonded hydrogen atoms in the same molecule. In certain embodiments, the silicone resin (A) includes at least two silicon-bonded alkenyl groups per molecule.

$R^1$ may be selected from any monovalent hydrocarbon group derived from a hydrocarbon. For example, $R^1$ may be aliphatic, aromatic, acyclic, cyclic, alicyclic, etc. Further, $R^1$ may include ethylenic unsaturation when $R^1$ is the alkenyl group. Additionally, $R^1$ may be substituted or unsubstituted. By "substituted," it is meant that one or more hydrogen atoms may be replaced with atoms other than hydrogen (e.g. a halogen atom, such as chlorine, fluorine, bromine, etc.), or a carbon atom within the chain of $R^1$ may be replaced with an atom other than carbon, i.e., $R^1$ may include one or more heteroatoms within the chain, such as oxygen, sulfur, nitrogen, etc.

The hydrocarbyl and substituted hydrocarbyl groups represented by $R^1$ have from 1 to 10 carbon atoms, alternatively from 1 to 6 carbon atoms, alternatively from 1 to 4 carbon atoms. Acyclic hydrocarbyl and substituted hydrocarbyl groups containing at least 3 carbon atoms can have a branched or unbranched structure. Examples of hydrocarbyl groups represented by $R^1$ include, but are not limited to, alkyl groups, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl groups, such as cyclopentyl, cyclohexyl, and methylcyclohexyl; aryl groups, such as phenyl and naphthyl; alkaryl groups, such as tolyl and xylyl; and aralkyl groups, such as benzyl and phenethyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

The alkenyl groups represented by $R^1$, which may be the same or different within the silicone resin (A), typically have from 2 to 10 carbon atoms, alternatively from 2 to 6 carbon atoms, and are exemplified by, for example, vinyl, allyl, butenyl, hexenyl, and octenyl.

According to a first embodiment, the silicone resin (A) has the formula:

$$(R^2R^3{}_2SiO_{1/2})_w(R^3{}_2SiO_{2/2})_x(R^3SiO_{3/2})_y(SiO_{4/2})_z \quad (I)$$

wherein $R^2$ is independently a substituted or unsubstituted $C_1$ to $C_{10}$ hydrocarbyl group free of aliphatic unsaturation; $R^3$ is independently selected from $R^2$, an alkenyl group, and a hydrogen atom; and w, x, y, and z are mole fractions. Typically, the silicone resin represented by formula (I) has an average of at least two silicon-bonded alkenyl groups per molecule. More specifically, the subscript w typically has a value of from 0 to 0.9, alternatively from 0.02 to 0.75, alternatively from 0.05 to 0.3. The subscript x typically has a value of from 0 to 0.9, alternatively from 0 to 0.45, alternatively from 0 to 0.25. The subscript y typically has a value of from 0 to 0.99, alternatively from 0.25 to 0.8, alternatively from 0.5 to 0.8. The subscript z typically has a value of from 0 to 0.85, alternatively from 0 to 0.25, alternatively from 0 to 0.15. Also, the ratio y+z/(w+x+y+z) is typically from 0.1 to 0.99, alternatively from 0.5 to 0.95, alternatively from 0.65 to 0.9. Further, the ratio w+x/(w+x+y+z) is typically from 0.01 to 0.90, alternatively from 0.10 to 0.75, alternatively from 0.30 to 0.50.

In certain embodiments wherein the silicone resin (A) includes M units, the subscript w typically has a value of from greater than 0 to 0.9, alternatively from 0.02 to 0.75, alternatively from 0.05 to 0.3. In certain embodiments wherein the silicone resin (A) includes D units, the subscript x typically has a value of from greater than 0 to 0.9, alternatively from greater than 0 to 0.45, alternatively from greater than 0 to 0.25. In certain embodiments wherein the silicone resin (A) includes T units, the subscript y typically has a value of from greater than 0 to 0.99, alternatively from 0.25 to 0.8, alternatively from 0.5 to 0.8. In certain embodiments wherein the silicone resin (A) includes Q units, the subscript z typically has a value of from greater than 0 to 0.85, alternatively from greater than 0 to 0.25, alternatively from greater than 0 to 0.15.

When the silicone resin (A) includes at least two silicon-bonded alkenyl groups per molecule, i.e., when $R^3$ is predominantly the alkenyl group, specific examples of silicone resins represented by formula (I) above include resins having the following formulae:

$(Vi_2MeSiO_{1/2})_{0.25}(PhSiO_{3/2})_{0.75}$, $(Vi_2MeSiO_{1/2})_{0.25}(MeSiO_{3/2})_{0.75}$, $(ViMe_2SiO_{1/2})_{0.25}(PhSiO_{3/2})_{0.75}$, $(ViMe_2SiO_{1/2})_{0.25}(MeSiO_{3/2})_{0.75}$, $(ViMe_2SiO_{1/2})_{0.25}(MeSiO_{3/2})_{0.25}(PhSiO_{3/2})_{0.50}$, $(ViMe_2SiO_{1/2})_{0.25}(MeSiO_{3/2})_{0.25}(MeSiO_{3/2})_{0.50}$, $(ViMe_2SiO_{1/2})_{0.15}(PhSiO_{3/2})_{0.75}(SiO_{4/2})_{0.1}$, $(ViMe_2SiO_{1/2})_{0.15}(MeSiO_{3/2})_{0.75}(SiO_{4/2})_{0.1}$ $(Vi_2MeSiO_{1/2})_{0.15}(ViMe_2SiO_{1/2})_{0.1}(PhSiO_{3/2})_{0.75}$, and $(Vi_2MeSiO_{1/2})_{0.15}(ViMe_2SiO_{1/2})_{0.1}(MeSiO_{3/2})_{0.75}$, wherein Me is methyl, Vi is vinyl, Ph is phenyl, and the numerical subscripts outside the parenthesis denote mole fractions corresponding to either w, x, y, or z as described above for formula (I). The sequence of units in the preceding formulae is not to be viewed in any way as limiting to the scope of the invention.

When the silicone resin (A) includes at least two silicon-bonded hydrogen atoms per molecule, i.e., when $R^3$ is predominantly hydrogen, specific examples of silicone resins represented by formula (I) above include resins having the following formulae:

$(HMe_2SiO_{1/2})_{0.25}(PhSiO_{3/2})_{0.75}$, $(HMe_2SiO_{1/2})_{0.25}(MeSiO_{3/2})_{0.75}$, $(HMeSiO_{2/2})_{0.3}(PhSiO_{3/2})_{0.6}(MeSiO_{3/2})_{0.1}$, and $(Me_3SiO_{1/2})_{0.1}(H_2SiO_{2/2})_{0.1}(MeSiO_{3/2})_{0.4}(PhSiO_{3/2})_{0.4}$, wherein Me is methyl, Ph is phenyl, and the numerical subscripts outside the parenthesis denote mole fractions. The sequence of units in the preceding formulae is not to be viewed in any way as limiting to the scope of the invention.

Additional examples of silicone resins suitable for the purposes of the silicone resin (A) of the composition are disclosed in U.S. Pat. No. 6,124,407, which is incorporated by reference herein in its entirety.

The silicone resin (A) typically has a number-average molecular weight (Mn) of from 500 to 50,000, alternatively from 1,000 to 30,000, alternatively 12,500 to 25,000. The number-average molecular weight (Mn) may be determined by gel permeation chromatography employing a low angle laser light scattering detector, or a refractive index detector and silicone resin (MQ) standards.

In various embodiments, the composition comprises the silicone resin (A) in an amount of from greater than 0 to 50, alternatively from 2 to 40, alternatively from 4 to 30, alternatively from 6 to 20, alternatively from 8 to 12, percent by weight based on the total weight of the composition.

The composition further comprises (B) an organosilicon compound. The organosilicon compound (B) includes an average of at least two silicon-bonded hydrogen atoms or at least two silicon-bonded alkenyl groups per molecule.

Generally, the organosilicon compound (B) does not include both silicon-bonded alkenyl groups and silicon-bonded hydrogen atoms in the same molecule.

When the silicone resin (A) includes silicon-bonded alkenyl groups, the organosilicon compound (B) includes at least two silicon-bonded hydrogen atoms per molecule, and when the silicone resin (A) includes silicon-bonded hydrogen atoms, the organosilicon compound (B) includes at least two silicon-bonded alkenyl groups per molecule. The organosilicon compound (B) may be referred to as a cross-linker or cross-linking agent.

In embodiments in which the organosilicon compound (B) includes silicon-bonded hydrogen atoms, the organosilicon compound (B) may be further defined as an organohydrogensilane, an organohydrogensiloxane, or a combination thereof. The structure of the organosilicon compound can be linear, branched, cyclic, or resinous. In acyclic polysilanes and polysiloxanes, the silicon-bonded hydrogen atoms can be located at terminal, pendant, or at both terminal and pendant positions. Cyclosilanes and cyclosiloxanes typically have from 3 to 12 silicon atoms, alternatively from 3 to 10 silicon atoms, alternatively from 3 to 4 silicon atoms.

The organohydrogensilane can be a monosilane, disilane, trisilane, or polysilane (i.e., a silane having four or more silicon atoms). When $R^3$ is predominantly the alkenyl group in the silicone resin (A), specific examples of organohydrogensilanes that are suitable for purposes of the organosilicon compound (B) of the subject invention include, but are not limited to, diphenylsilane, 2-chloroethylsilane, bis[(p-dimethylsilyl)phenyl]ether, 1,4-dimethyldisilylethane, 1,3,5-tris(dimethylsilyl)benzene, 1,3,5-trimethyl-1,3,5-trisilane, poly(methylsilylene)phenylene, and poly(methylsilylene)methylene. When $R^3$ is predominantly hydrogen in the silicone resin (A), specific examples of the organosilicon compound (B) that are suitable for purposes of the subject invention include, but are not limited to, silanes having the following formulae:

$Vi_4Si, PhSiVi_3, MeSiVi_3, PhMeSiVi_2, Ph_2SiVi_2,$ and $PhSi(CH_2CH=CH_2)_3,$ wherein Me is methyl, Ph is phenyl, and Vi is vinyl.

In certain embodiments in which the organosilicon compound (B) includes silicon-bonded hydrogen atoms, the organosilicon compound (B) has the general formula (III):

$HR^2_2Si-R^4-SiR^2_2H$ (III)

wherein $R^2$ is as defined and exemplified above and $R^4$ is a hydrocarbylene group free of aliphatic unsaturation having a formula selected from the following structures:

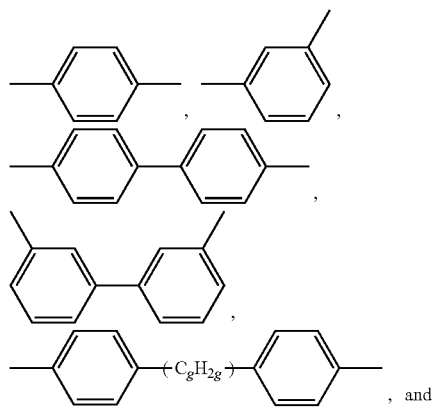
, and

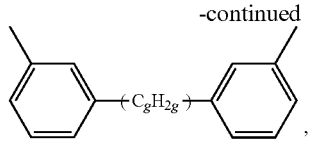
, wherein g is from 1 to 6.

Specific examples of organohydrogensilanes having the formula (III), wherein $R^2$ and $R^4$ are as described and exemplified above include, but are not limited to, organohydrogensilanes having a formula selected from the following structures:

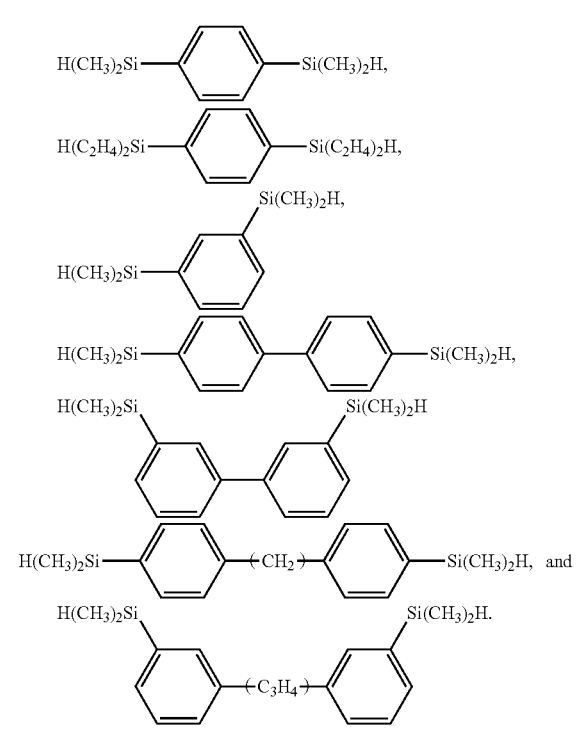

When the organosilicon compound (B) comprises the organohydrogensiloxane, the organohydrogensiloxane can be a disiloxane, trisiloxane, or polysiloxane. Examples of organohydrogensiloxane suitable for use as the organosilicon compound (B) include, but are not limited to, siloxanes having the following formulae:

$PhSi(OSiMe_2H)_3, Si(OSiMe_2H)_4, MeSi(OSiMe_2H)_3,$ and $Ph_2Si(OSiMe_2H)_2,$ wherein Me is methyl, and Ph is phenyl.

Specific examples of organohydrogensiloxanes that are suitable for purposes of the organosilicon compound (B) include 1,1,3,3-tetramethyldisiloxane, 1,1,3,3-tetraphenyldisiloxane, phenyltris(dimethylsiloxy)silane, 1,3,5-trimethylcyclotrisiloxane, a trimethylsiloxy-terminated poly(methylhydrogensiloxane), a trimethylsiloxy-terminated poly(dimethylsiloxane/methylhydrogensiloxane), a dimethylhydrogensiloxy-terminated poly(methylhydrogensiloxane), and a resin including $HMe_2SiO_{1/2}$ units, $Me_3SiO_{1/2}$ units, and $SiO_{4/2}$ units, wherein Me is methyl.

Alternatively, the organosilicon compound (B) may comprise an organohydrogenpolysiloxane resin when the organosilicon compound includes silicon-bonded hydrogen atoms. The organohydrogenpolysiloxane resin is typically a copolymer including $R^5SiO_{3/2}$ units, i.e., T units, and/or $SiO_{4/2}$ units, i.e., Q units, in combination with $R^2R^5_2SiO_{1/2}$ units, i.e., M units, and/or $R^5_2SiO_{2/2}$ units, i.e., D units, wherein $R^2$ is as described and exemplified above. For example, the organohydrogenpolysiloxane resin can be a DT resin, an MT resin, an MDT resin, a DTQ resin, an MTQ resin, an MDTQ resin, a DQ resin, an MQ resin, a DTQ resin, an MTQ resin, or an MDQ resin.

The group represented by $R^5$ is either $R^2$ or an organosilylalkyl group having at least one silicon-bonded hydrogen atom. Examples of organosilylalkyl groups represented by $R^5$ include, but are not limited to, groups having a formula selected from the following structures:

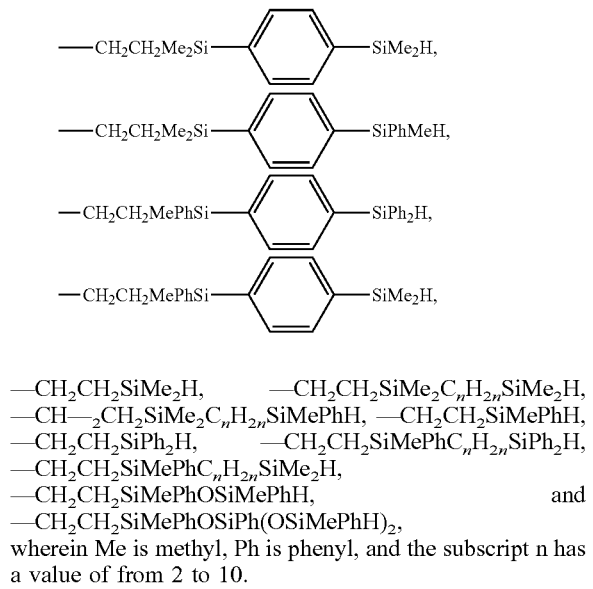

—$CH_2CH_2SiMe_2H$, —$CH_2CH_2SiMe_2C_nH_{2n}SiMe_2H$,
—$CH$—$_2CH_2SiMe_2C_nH_{2n}SiMePhH$, —$CH_2CH_2SiMePhH$,
—$CH_2CH_2SiPh_2H$, —$CH_2CH_2SiMePhC_nH_{2n}SiPh_2H$,
—$CH_2CH_2SiMePhC_nH_{2n}SiMe_2H$,
—$CH_2CH_2SiMePhOSiMePhH$, and
—$CH_2CH_2SiMePhOSiPh(OSiMePhH)_2$,
wherein Me is methyl, Ph is phenyl, and the subscript n has a value of from 2 to 10.

In various embodiments in which the organosilicon compound (B) comprises the organohydrogenpolysiloxane resin, the organohydrogenpolysiloxane resin typically has the formula:

$$(R^2R^5_2SiO_{1/2})_w(R^5_2SiO_{2/2})_x(R^5SiO_{3/2})_y(SiO_{4/2})_z \qquad (IV)$$

wherein $R^2$, $R^5$, w, x, y, and z are each as defined and exemplified above.

Specific examples of organohydrogenpolysiloxane resins represent by formula (IV) above include, but are not limited to, resins having the following formulae:

$((HMe_2SiC_6H_4SiMe_2CH_2CH_2)_2MeSiO_{1/2})_{0.12}(PhSiO_{3/2})_{0.88}$, $((HMe_2SiC_6H_4SiMe_2CH_2CH_2)_2MeSiO_{1/2})_{0.17}(PhSiO_{3/2})_{0.83}$, $((HMe_2SiC_6H_4SiMe_2CH_2CH_2)_2MeSiO_{1/2})_{0.17}(MeSiO_{3/2})_{0.17}(PhSiO_{3/2})_{0.66}$, $((HMe_2SiC_6H_4SiMe_2CH_2CH_2)_2MeSiO_{1/2})_{0.15}(PhSiO_{3/2})_{0.75}(SiO_{4/2})_{0.10}$, and $((HMe_2SiC_6H_4SiMe_2CH_2CH_2)_2MeSiO_{1/2})_{0.08}$
$((HMe_2SiC_6H_4SiMe_2CH_2CH_2)Me_2SiO_{1/2})_{0.06}$
$(PhSiO_{3/2})_{0.86}$, wherein Me is methyl, Ph is phenyl, $C_6H_4$ denotes a paraphenylene group, and the numerical subscripts outside the parenthesis denote mole fractions. The sequence of units in the preceding formulae is not to be viewed in any way as limiting to the scope of the invention.

The organosilicon compound (B) can be a single organosilicon compound or a mixture comprising two or more different organosilicon compounds, each as described above. For example, the organosilicon compound (B) can be a single organohydrogensilane, a mixture of two different organohydrogensilanes, a single organohydrogensiloxane, a mixture of two different organohydrogensiloxanes, or a mixture of an organohydrogensilane and an organohydrogensiloxane. In particular, the organosilicon compound (B) can be a mixture comprising the organohydrogenpolysiloxane resin having the formula (IV) in an amount of at least 0.5% (w/w), alternatively at least 50% (w/w), alternatively at least 75% (w/w), based on the total weight of the organosilicon compound (B), with the organosilicon compound (B) further comprising an organohydrogensilane and/or organohydrogensiloxane, the latter different from the organohydrogenpolysiloxane resin. In certain embodiments, the organosilicon compound (B) comprises the organohydrogenpolysiloxane resin.

The concentration of organosilicon compound (B) in the composition is sufficient to cure (i.e., cross-link) the silicone resin (A). The exact amount of the organosilicon compound (B) depends on the desired extent of cure. The concentration of the organosilicon compound (B) is typically sufficient to provide from 0.4 to 4.0 moles of silicon-bonded hydrogen atoms, alternatively from 0.8 to 3.0 moles of silicon-bonded hydrogen atoms, alternatively from 1.2 to 2.8 moles of silicon-bonded hydrogen atoms, per mole of alkenyl groups in silicone resin (A). However, this concentration is contingent on other factors, e.g. the presence or absence of additional components which may include silicon-bonded alkenyl groups, as described below.

The composition additionally comprises (C) a hydrosilylation catalyst. The hydrosilylation catalyst (C) promotes the reaction between the silicone resin (A) and the organosilicon compound (B). The hydrosilylation catalyst (C) can be any of the well-known hydrosilylation catalysts comprising a platinum group metal (i.e., platinum, rhodium, ruthenium, palladium, osmium and iridium) or a compound containing a platinum group metal. Typically, the platinum group metal is platinum, based on its high activity in hydrosilylation reactions.

Specific hydrosilylation catalysts suitable for (C) include the complexes of chloroplatinic acid and certain vinyl-containing organosiloxane disclosed by Willing in U.S. Pat. No. 3,419,593, the portions of which address hydrosilylation catalysts are hereby incorporated by reference. A catalyst of this type is the reaction product of chloroplatinic acid and 1,3-diethenyl-1,1,3,3-tetramethyldisiloxane.

The hydrosilylation catalyst can also be a supported hydrosilylation catalyst comprising a solid support having a platinum group metal on the surface thereof. A supported catalyst can be conveniently separated from the organohydrogenpolysiloxane resin represented by formula (IV), for example, by filtering the reaction mixture. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

In addition or alternatively, the hydrosilylation catalyst (C) can also be a microencapsulated platinum group metal-containing catalyst comprising a platinum group metal encapsulated in a thermoplastic resin. Hydrosilylation-curable silicone compositions including microencapsulated hydrosilylation catalysts are stable for extended periods of time, typically several months or longer, under ambient conditions, yet cure relatively rapidly at temperatures above the melting or softening point of the thermoplastic resin(s). Microencapsulated hydrosilylation catalysts and methods of preparing them are well known in the art, as exemplified in U.S. Pat. No. 4,766,176 and the references cited therein, and U.S. Pat. No. 5,017,654. The hydrosilylation catalyst (C) can be a single catalyst or a mixture comprising two or more different catalysts that differ in at least one property, such as structure, form, platinum group metal, completing ligand, and thermoplastic resin.

In another embodiment, the hydrosilylation catalyst (C) may be at least one photoactivated hydrosilylation catalyst. The photoactivated hydrosilylation catalyst can be any hydrosilylation catalyst capable of catalyzing the hydrosilylation of the silicone resin (A) and the organosilicon compound (B) upon exposure to radiation having a wavelength of from 150 to 800 nm. The photoactivated hydrosilylation catalyst can be any of the well-known hydrosilylation catalysts comprising a platinum group metal or a compound containing a platinum group metal. The platinum group metals include platinum, rhodium, ruthenium, palladium, osmium, and iridium. Typically, the platinum group metal is platinum, based on its high activity in hydrosilylation reactions. The suitability of particular photoactivated hydrosilylation catalysts for use in the silicone composition of the subject invention can be readily determined by routine experimentation.

Specific examples of photoactivated hydrosilylation catalysts suitable for purposes of the subject invention include, but are not limited to, platinum(II) β-diketonate complexes such as platinum(II) bis(2,4-pentanedioate), platinum(II) bis(2,4-hexanedioate), platinum(II) bis(2,4-heptanedioate), platinum(II) bis(1-phenyl-1,3-butanedioate, platinum(II) bis (1,3-diphenyl-1,3-propanedioate), platinum(II) bis(1,1,1,5, 5,5-hexafluoro-2,4-pentanedioate); (η-cyclopentadienyl)trialkylplatinum complexes, such as (Cp)trimethylplatinum, (Cp)ethyldimethylplatinum, (Cp)triethylplatinum, (chloro-Cp)trimethylplatinum, and (trimethylsilyl-Cp)trimethylplatinum, where Cp represents cyclopentadienyl; triazene oxide-transition metal complexes, such as $Pt[C_6H_5NNNOCH_3]_4$, $Pt[p-CN-C_6H_4NNNOC_6H_{11}]_4$, $Pt[p-H_3COC_6H_4NNNOC_6H_{11}]_4$, $Pt[p-CH_3(CH_2)_x-C_6H_4NNNOCH_3]_4$, 1,5-cyclooctadiene.Pt[p-CN—$C_6H_4NNNOC_6H_{11}]_2$, 1,5-cyclooctadiene.Pt[p-CH$_3$O—$C_6H_4NNNOCH_3]_2$, $[(C_6H_5)_3P]_3Rh[p-CN-C_6H_4NNNOC_6H_{11}]$, and $Pd[p-CH_3(CH_2)_x-C_6H_4NNNOCH_3]_2$, where x is 1, 3, 5, 11, or 17; (η-diolefin) (σ-aryl)platinum complexes, such as ($η^4$-1,5-cyclooctadienyl)diphenylplatinum, $η^4$-1,3,5,7-cyclooctatetraenyl)diphenylplatinum, ($η^4$-2,5-norboradienyl)diphenylplatinum, ($η^4$-1,5-cyclooctadienyl) bis-(4-dimethylaminophenyl)platinum, ($η^4$-1,5-cyclooctadienyl)bis-(4-acetylphenyl)platinum, and ($η^4$-1,5-cyclooctadienyl)bis-(4-trifluormethylphenyl)platinum. Typically, the photoactivated hydrosilylation catalyst is a Pt(II) β-diketonate complex and more typically the catalyst is platinum(II) bis(2,4-pentanedioate). The hydrosilylation catalyst (C) can be a single photoactivated hydrosilylation catalyst or a mixture comprising two or more different photoactivated hydrosilylation catalysts.

The concentration of the hydrosilylation catalyst (C) is sufficient to catalyze the addition reaction of the silicone resin (A) and the organosilicon compound (B). The concentration of the hydrosilylation catalyst (C) is sufficient to provide typically from 0.1 to 1000 ppm of platinum group metal, alternatively from 0.5 to 100 ppm of platinum group metal, alternatively from 1 to 25 ppm of platinum group metal, based on the combined weight of the silicone resin (A) and the organosilicon compound (B).

Further, the composition comprises (D) a flame retardant component comprising aluminum hydroxide. The aluminum hydroxide is present in the flame retardant component (D) in an amount to provide at least 15, alternatively at least 20, alternatively at least 25, alternatively at least 26, alternatively at least 27, alternatively at least 28, alternatively at least 29, parts by weight of the aluminum hydroxide in the composition based on 100 parts by weight of the composition. For example, in various embodiments, the aluminum hydroxide of the flame retardant component (D) is present in the composition in an amount of from 15 to 45, alternatively from 20 to 40, alternatively from 25 to 35, alternatively from 28 to 32, parts by weight based on 100 parts by weight of the composition. The ranges set forth above generally relate to the composition when the composition is solventless. As such, in embodiments in which solvent is optionally present in the composition, the relative amount of aluminum hydroxide may deviate from the ranges set forth above. However, the composition is typically solventless.

The flame retardant component (D) of the composition may further comprise flame retardant additives in combination with the aluminum hydroxide. For example, the flame retardant component (D) of the composition may further comprise halogenated hydrocarbons, magnesium hydroxide, organophosphorous compounds and/or other fire retardant materials. In certain embodiments, the flame retardant component (D) is free from halogenated hydrocarbons and organophosphorous compounds.

In certain embodiments, the flame retardant component (D) further comprises magnesium hydroxide. The magnesium hydroxide is typically present in the flame retardant component (D) in an amount to provide at least 3, alternatively at least 4, alternatively at least 5, alternatively at least 6, alternatively at least 7, parts by weight of the magnesium hydroxide in the composition based on 100 parts by weight of the composition. For example, in various embodiments, the magnesium hydroxide of the flame retardant component (D) is present in the composition in an amount of from 2 to 14, alternatively from 4 to 12, alternatively from 6 to 10, alternatively from 7 to 9, parts by weight based on 100 parts by weight of the composition. The ranges set forth above generally relate to the composition when the composition is solventless. As such, in embodiments in which solvent is optionally present in the composition, the relative amount of magnesium hydroxide may deviate from the ranges set forth above. However, the composition is typically solventless.

The composition further comprises (E) a reflective component different from component (D) and comprising titanium dioxide. The reflective component comprises titanium dioxide in an amount to provide no more than 15, alternatively no more than 10, alternatively no more than 9, alternatively no more than 8, alternatively no more than 7, parts by weight of the titanium dioxide in the composition based on 100 parts by weight of said composition. For example, in various embodiments, the titanium dioxide of the reflective component (E) is present in the composition in an amount of from 2 to 10, alternatively from 3 to 9, alternatively from 4 to 8, alternatively from 5 to 7, parts by weight based on 100 parts by weight of the composition. The ranges set forth above generally relate to the composition when the composition is solventless. As such, in embodiments in which solvent is optionally present in the composition, the relative amount of titanium dioxide may deviate from the ranges set forth above. The titanium dioxide may be utilized in combination with other, i.e., additional, reflective components, although titanium dioxide is generally the sole reflective component in component (E).

The titanium dioxide of the reflective component (E) may consist essentially of titanium dioxide or consist of titanium dioxide. Alternatively, the titanium dioxide of the reflective component (E) may comprise a core particle having a titanium oxide layer thereon. Alternatively still, the core particle may comprise titanium dioxide and a layer other than titanium dioxide may be disposed about the core particle. Further, the core particle may comprise titanium dioxide which does not include any coating or layer thereon, i.e., the titanium dioxide consists of the core particle. For example, the core particle may comprise mica, which is covered with titanium oxide or a pigment of a composite oxide containing titanium oxide. Most typically, however, the core particle consists essentially of titanium dioxide, i.e., the core particle comprises titanium dioxide in an amount of at least about 95, alternatively at least about 96, alternatively at least about 97, alternatively at least about 98, alternatively at least about 99, alternatively at least about 99.9 percent by weight titanium dioxide based on 100 parts by weight of the core particle.

The titanium dioxide may have various shapes, e.g. the titanium dioxide may be generally spherical or generally elliptical, or the titanium dioxide may have an irregular shape. Typically, however, the titanium dioxide is spherical. The titanium dioxide is typically in a crystalline form. The crystalline form of the titanium dioxide may independently be, for example, a rutile form, an anatase form, or a brookite form, because titanium dioxide is polymorphic. Typically, however, the crystalline form of the titanium dioxide is rutile form, which generally has a lower photoactivity than other crystalline forms of titanium dioxide. The particular average diameter of the titanium dioxide may vary and is generally chosen based on desired physical and optical properties of the article formed from the composition.

The reflective component (E) may further comprise additional pigments or additives. For example, the reflective component may optionally further comprise zirconium oxide or cerium oxide, zinc oxide, iron (II; III) oxide, chromium oxide, bismuth oxychloride, as well as compounds and composites of barium (e.g. barium sulfate), strontium, and calcium.

In various embodiments, the composition further comprises (F) a filler different from components (D) and (E). The filler (F) is different from aluminum hydroxide and magnesium hydroxide (as well as any other flame retardant additives present in (D)) and is different from titanium dioxide any other reflective components present in (E). In various embodiments, aluminum hydroxide and magnesium hydroxide are the only flame retardant additives present in (D) and titanium dioxide is the only reflective component present in (D). As such, in these embodiments, any other fillers, e.g. extending or reinforcing fillers, may be categorized as component (F).

The filler (F) may be a single type of filler or the filler (F) may comprise a blend of different types or sizes of fillers. The filler (F) may be selected from inorganic fillers in particulate form, such as silica, alumina, calcium carbonate, and mica. In one embodiment, for example, the composition comprises silica particles, e.g. silica nanoparticles, as component (F). One particularly useful form of silica nanoparticles are fumed silica nanoparticles. Examples of useful commercially available unmodified silica starting materials include nano-sized colloidal silicas available under the product designations NALCO 1040, 1042, 1050, 1060, 2326, 2327, and 2329 colloidal silica from Nalco Chemical Co., Naperville, Ill., Aerosil® from Degussa, Ludox® from DuPont, Snowtex® from Nissan Chemical, Levasil® from Bayer, or Sylysia® from Fuji Silysia Chemical. Suitable fumed silicas include, for example, products commercially available from DeGussa AG, (Hanau, Germany) under the trade designation, "Aerosil series OX 50", as well as product numbers-130, -150, and -200. Fumed silicas are also commercially available from Cabot Corp., Tuscola, I, under the Bade designations CAB O-SPERSE 2095", "CAB-O-SPERSE A105", and "CAB-O-SIL M5".

The silica of component (F) may be in the form of a colloidal dispersion. The silica of component (F) thus may be dispersed in a polar solvent such as methanol, ethanol, isopropyl alcohol (IPA), ketones such as methyl isobutyl ketone, water, acetic acid, diols and trials such as propylene glycol, 2-methyl-1,3-propane diol $HOCH_2CH(CH_3)CH_2OH$, 1,2-hexanediol $CH_3(CH_2)_3CH(OH)CH_2OH$, and glycerol; glycerol esters such as glyceryl triacetate (triacetin), glyceryl tripropionate (tripropionin), and glyceryl tributyrate (tributyrin); and polyglycols such as polyethylene glycols and polypropylene glycols, among which are PPG-14 butyl ether $C_4H_9(OCH(CH_3)CH_2)_{14}OH$. Alternatively, the silica of component (F) can also be dispersed in a non-polar solvent such as toluene, benzene, xylene, etc.

In certain embodiments, the silica of component (F) has an average particle size of from 1 to 1000, alternatively from 1 to 100, or alternatively from 5 to 30 nm. The silica of component (F) can be a single type of silica or a mixture comprising at least two different types of silica. It is known that silica may be of pure silicon dioxide, or they may contain a certain amount of impurities such as $Al_2O_3$, ZnO, and/or cations such as $Na^+$, $K^{++}$, $Ca^{++}$, $Mg^{++}$, etc.

However, the filler of component (F) need not be a nanoparticle or a silica. For example, the at least one filler is exemplified by reinforcing and/or extending fillers such as, alumina, calcium carbonate (e.g., fumed, fused, ground, and/or precipitated), diatomaceous earth, quartz, silica (e.g., fumed, fused, ground, and/or precipitated), talc, zinc oxide, chopped fiber such as chopped KEVLAR®, onyx, beryllium oxide, zinc oxide, aluminum nitride, boron nitride, silicon carbide, tungsten carbide; and combinations thereof.

The filler of component (F) may optionally be surface treated with a filler treating agent. The filler (F) may be surface treated prior to incorporation into the composition or the filler (F) may be surface treated in situ.

The amount of the filler treating agent utilized to treat the filler (F) may vary depending on various factors including the type and amounts of fillers utilized in component (F) and whether the filler (F) is treated with filler treating agent in situ or pretreated before being incorporated into the composition.

The filler treating agent may comprise a silane such as an alkoxysilane, an alkoxy-functional oligosiloxane, a cyclic polyorganosiloxane, a hydroxyl-functional oligosiloxane such as a dimethyl siloxane or methyl phenyl siloxane, a stearate, or a fatty acid.

Alkoxysilane filler treating agents are exemplified by, for example, hexyltrimethoxysilane, octyltriethoxysilane, decyltrimethoxysilane, dodecyltrimethoxysilane, tetradecyltrimethoxysilane, phenyltrimethoxysilane, phenylethyltrimethoxysilane, octadecyltrimethoxysilane, octadecyltriethoxysilane, and a combination thereof.

Alkoxy-functional oligosiloxanes can also be used as filler treating agents. Alkoxy-functional oligosiloxanes and methods for their preparation are known in the art. For example, suitable alkoxy-functional oligosiloxanes include those of the formula $(R^6O)_q Si(OSiR^6{}_2R^7)_{(4-q)}$. In this formula, subscript q' is 1, 2, or 3, alternatively q' is 3. Each $R^6$ can be independently selected from saturated and unsaturated monovalent hydrocarbon groups having from 1 to 10 carbon atoms. Each $R^7$ can be a saturated or unsaturated monovalent hydrocarbon group.

Alternatively, silazanes may be utilized as the filler treating agent, either discretely or in combination with, for example, alkoxysilanes.

Alternatively still, the filler treating agent can be any of the organosilicon compounds typically used to treat silica fillers. Examples of organosilicon compounds include, but are not limited to, organochlorosilanes such as methyltrichlorosilane, dimethyldichlorosilane, and trimethyl monochlorosilane; organosiloxanes such as hydroxy-endblocked dimethylsiloxane oligomer, hexamethyldisiloxane, and tetramethyldivinyldisiloxane; organosilazanes such as hexamethyldisilazane and hexamethylcyclotrisilazane; and organoalkoxysilanes such as methyltrimethoxysilane, vinyltrimethoxysilane, vinyltriethoxysilane, 3-glycidoxypropyltrimethoxysilane, and 3-methacryloxypropyltrimethoxysilane. Examples of stearates include calcium stearate. Examples of fatty acids include stearic acid, oleic acid, palmitic acid, tallow, coconut oil, and combinations thereof The average particle size of the filler (F) will depend on various factors including the type of filler (F) selected and the exact amount added to the composition. In certain embodiments, silica, e.g. fumed silica, is utilized as the sole filler in component (F) of the composition.

The filler (F) is typically present in the composition in an amount of from greater than 0 to 15, alternatively from 2 to 13, alternatively from 4 to 11, alternatively from 6 to 9, alternatively from 7 to 8, parts by weight based on 100 parts by weight of the composition. These ranges relate to the total amount of the filler included in component (F), i.e., when two or more different fillers are utilized in component (F), the ranges above account for the total amount of component (F). The ranges set forth above generally relate to the composition when the composition is solventless. As such, in embodiments in which solvent is optionally present in the composition, the relative amount of component (F) may deviate from the ranges set forth above.

In various embodiments, the composition further comprises (G) an organopolysiloxane polymer having at least two silicon-bonded alkenyl groups per molecule or at least two silicon-bonded hydrogen atoms per molecule. Depending on a molecular weight and viscosity of the organopolysiloxane polymer (G), the organopolysiloxane polymer (G) may serve as a diluent for the composition, particularly when the composition is otherwise solventless. Moreover, because the organopolysiloxane polymer (G) includes at least two silicon-bonded alkenyl groups or at least two silicon-bonded hydrogen atoms, the organopolysiloxane polymer (G) may react with the silicone resin (A) or the organosilicon compound (B). Generally, when the silicone resin (A) includes at least two silicon-bonded alkenyl groups, the organopolysiloxane polymer (G) also includes at least two silicon-bonded alkenyl groups, and when the silicone resin (A) includes at least two silicon-bonded hydrogen atoms, the organopolysiloxane polymer (G) also includes at least two silicon-bonded hydrogen atoms. The silicone resin (A) may optionally be blended or otherwise combined with the organopolysiloxane polymer (G) prior to or during formation of the composition. The organopolysiloxane polymer (G) generally introduces repeating D units within the article formed from the composition. The organopolysiloxane polymer (G) may be referred to as a silicone oil or fluid.

The at least two silicon-bonded alkenyl groups or the at least two silicon-bonded hydrogen atoms of the organopolysiloxane polymer (G) may be terminal, pendent, or terminal and pendent. In certain embodiments, the at least two silicon-bonded alkenyl groups or the at least two silicon-bonded hydrogen atoms of the organopolysiloxane polymer (G) are terminal, i.e., the organopolysiloxane polymer (G) includes at least two terminal silicon-bonded alkenyl groups or at least two terminal silicon-bonded hydrogen atoms. However, even in such embodiments, the organopolysiloxane polymer (G) may further include the desired functionality (i.e., silicon-bonded alkenyl groups or silicon-bonded hydrogen atoms) at pendent locations of the molecular chain.

In various embodiments in which the organopolysiloxane polymer (G) includes the at least two silicon-bonded alkenyl groups, the organopolysiloxane polymer (G) has the general formula (V):

$$R^8{}_aR^9{}_{3-a}SiO(R^9{}_2SiO)_bSiR^8{}_aR^9{}_{3-a'} \qquad (V).$$

In general formula (V) above, subscript a' is independently selected from 1, 2, or 3, $R^8$ is an independently selected alkenyl group, and $R^9$ is independently selected from substituted or unsubstituted hydrocarbyl groups having from 1 to 10 carbon atoms. Subscript b' is in general formula (V) is selected based on the desired molecular weight of the organopolysiloxane polymer (G) and is an integer greater than 1. The weight average molecular weight of the organopolysiloxane polymer (G) may range, for example, from greater than 1,000 to 1,000,000, alternatively from 10,000 to 500,000, alternatively from 15,000 to 150,000.

Specific examples of organopolysiloxane polymers suitable for use as component (G) when component (G) has silicon-bonded alkenyl groups include, but are not limited to, organopolysiloxane polymer having the following formulae:

$$ViMe_2SiO(Me_2SiO)_bSiMe_2Vi,$$
$$ViMe_2SiO(Ph_2SiO)_bSiMe_2Vi,$$

$$ViMe_2SiO(PhMeSiO)_bSiMe_2Vi,$$
$$Vi_2MeSiO(Me_2SiO)_bSiMe_2Vi,$$

$$Vi_2MeSiO(Me_2SiO)_bSiMeVi_2, \text{ and } Vi_2MeSiO(Ph_2SiO)_bSiMe_2Vi,$$

wherein Me is methyl, Ph is phenyl, Vi is vinyl, and the subscript b' is an integer greater than 1. Component (G) of the composition may be a single organopolysiloxane polymer or a mixture comprising two or more different organopolysiloxane polymers.

In certain embodiments, component (G) of the composition comprises a blend of two different organopolysiloxane polymers. In such an embodiment, the organopolysiloxane polymers may differ in terms of molecular structure, substituents, molecular weight, etc. As one specific example, the first organopolysiloxane polymer may have a weight average molecular weight of from 40,000 to 60,000 and the second organopolysiloxane polymer may have a weight average molecular weight of from 90,000 to 110,000.

When present, the organopolysiloxane of component (G) is typically utilized in an amount of from at least 10, alternatively at least 20, alternatively at least 25, alternatively at least 30, parts by weight based on 100 parts by weight of the composition. These ranges relate to the total amount of the organopolysiloxane polymers included in component (G), i.e., when two or more different organopolysiloxane polymers are utilized in component (G), the ranges above account for the total amount of component (G).

The ranges set forth above generally relate to the composition when the composition is solventless. As such, in embodiments in which solvent is optionally present in the composition, the relative amount of component (G) may deviate from the ranges set forth above.

In the specific embodiment introduced above in which component (G) comprises a blend of two different organopolysiloxane polymers, the relative amounts of the first and second organopolysiloxane polymers in component (G) may vary. However, the first organopolysiloxane polymer, which typically has a lesser weight average molecular weight than the second organopolysiloxane polymer, is typically utilized in a greater amount than the second organopolysiloxane polymer. In such embodiments, the only differences between the first and second organopolysiloxane polymers in component (G) may be their respective molecular weights (and associated viscosities).

The composition of the subject invention can comprise additional ingredients, as known in the art. Examples of additional ingredients include, but are not limited to, hydrosilylation catalyst inhibitors, such as 3-methyl-3-penten-1-yne, 3,5-dimethyl-3-hexen-1-yne, 3,5-dimethyl-1-hexyn-3-ol, 1-ethynyl-1-cyclohexanol, 2-phenyl-3-butyn-2-ol, vinylcyclosiloxanes, and triphenylphosphine; adhesion promoters, such as the adhesion promoters taught in U.S. Pat. Nos. 4,087,585 and 5,194,649; dyes; pigments; antioxidants; heat stabilizers; UV stabilizers; and flow control additives.

The composition may be a one component composition or a two component composition. Typically, the composition is a two component composition, with the two components being combined and cured to form the article.

The subject invention also provides an article formed from the composition. The article is generally the cured product of the composition and may be formed by, for example, injection molding, transfer molding, casting, extruding, overmolding, compression molding, or cavity molding the composition.

For example, in one embodiment, the article is further defined as a molded article. The subject invention also provides a method of preparing the molded article. The method comprises disposing the composition into a mold, and curing the composition in the mold to form the molded article. In such embodiments, the composition is generally cured in the mold to form the molded article via the application of heat. The mold may be, for example, an injection mold, a transfer mold, a compression mold, a cavity mold, etc.

The article of the instant invention has excellent physical and optical properties and may be utilized in various end uses and applications.

For example, the article has excellent reflectance. Reflectance is generally defined as a percent reflectance for light at a wavelength range of from 430 to 700 nanometers (nm) of the electromagnetic spectrum. Reflectance is generally measured via a spectrophotometer. Notably, reflectance may also depend on the thickness of the article because reflection can occur in the volume of the article in addition to the surface of the article.

To this end, the article of the instant invention generally has a reflectance of at least 85, alternatively at least 90, alternatively at least 91, alternatively at least 92, alternatively at least 93, alternatively at least 94, alternatively at least 95, alternatively at least 96, alternatively at least 97, alternatively at least 98, alternatively at least 99, percent, at a thickness of about 3 millimeters, alternatively about 2 millimeters, alternatively about 1 millimeter. Moreover, the reflectance values set forth above are generally maintained even after thermally aging the article, e.g. at 150° C., for an extended period of time, e.g. at least 1,000, alternatively at least 2,000, alternatively at least 3,000, alternatively at least 4,000, alternatively at least 5,000, alternatively at least 6,000, hours. By "generally maintained," with reference to the reflectance values being generally maintained even after thermal aging of the article, means that the reflectance values vary in an amount of less than 5, alternatively less than 4, alternatively less than 3, alternatively less than 2, alternatively less than 1, alternatively less than 0.5, percent after thermal aging of the article. Conventional articles including reflective pigments generally have a reduced reflectance after thermal aging, which has adverse effects in certain applications. For example, when the article is incorporated into device for reflecting light, e.g. as a mixing chamber, a nominal decrease of reflectance of even 1% may translate to a 10% decrease in light output from the device, which is undesirable.

Not only does the article have excellent reflectance, but the article also has excellent flame retardant properties, including self-extinguishing properties. For example, it is believed that the article of the instant invention may achieve a V-0 rating (or flame-retardant classification) in accordance with UL 94, which is a plastics flammability standard released by Underwriters Laboratories. Such a V-0 rating requires not only flame retardant properties, but self-extinguishing properties upon exposure to an open flame as well. It is believed that the article achieves a V-0 rating in accordance with UL 94 at a thickness of about 3, alternatively at a thickness of about 2, alternatively at a thickness of about 1, millimeters, although independent confirmation/certification is generally required relative UL 94.

The specific amounts of components (D) and (E) in the composition, as well as the particular compounds utilized as components (D) and (E) in the compositions, have been surprisingly found to impart the article with such excellent flame retardant and self-extinguishing properties. For example, conventional reflective articles rely on high loadings of reflective pigments, such as titanium dioxide. However, such conventional articles are not only self-extinguishing, but such conventional articles typically burn prolifically when exposed to a flame. To this end, it has been surprisingly found that by including aluminum hydroxide in component (D) in an amount to provide at least 15 parts by weight of aluminum hydroxide in the composition, and by including the titanium dioxide of component (D) in an amount to provide no more than 15 parts by weight of titanium dioxide in the composition, each based on 100 parts by weight of the composition, the article formed therefrom has excellent flame retardant and self-extinguishing properties while having an increased reflectivity.

The composition described above may be used to fabricate various components in optical devices. Said differently, the article of the instant invention may be utilized in various optical device applications. For example, such optical devices include, optical waveguides, mixing chambers, lighting reflectors, light engines, troffers, optical cameras, photo-couplers, charged coupled devices, lightguides, light-sensing elements, and LED packages such as high brightness LED (HBLED) housings or other light housings.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the subject invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the subject invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

EXAMPLES

Examples 1-3

Compositions are prepared in accordance with the subject disclosure. In particular, Table 1 below sets forth the components and relative amounts of each component of the compositions of Examples 1-3. Any percentages set forth below relate to weight percentages based on the total weight of each composition, but for the values reported for the hydrosilylation catalyst (C), which reflect parts per million (ppm) of platinum in the respective compositions.

TABLE 1

| | Example | | |
|---|---|---|---|
| Component | 1 | 2 | 3 |
| Silicone Resin (A) | 9.95 | 12.70 | 11.97 |
| Organosilicon Compound (B) | 1.8 | 0 | 2.82 |

TABLE 1-continued

| | Example | | |
|---|---|---|---|
| Component | 1 | 2 | 3 |
| Organosilicon Compound (B') | 0 | 0.72 | 0 |
| Hydrosilylation Catalyst (C) (ppm) | 1.6 | 1.0 | 2.1 |
| Flame Retardant Component (D) | 30 | 55 | 0 |
| Flame Retardant Component (D') | 0 | 0 | 30 |
| Flame Retardant Component (D") | 10 | 0 | 6 |
| Reflective Component (E) | 6 | 5 | 6 |
| Filler (F) | 7.22 | 0 | 7.51 |
| Organopolysiloxane Polymer (G) | 19.90 | 21.16 | 23.93 |
| Organopolysiloxane Polymer (G') | 10.83 | 4.23 | 11.26 |

Silicone Resin (A) is an MQ resin having at least two silicon-bonded alkenyl groups per molecule.

Organosilicon Compound (B) is an organohydrogensiloxane having at least two silicon-bonded hydrogen atoms per molecule.

Organosilicon Compound (B') is a different organohydrogensiloxane having at least two silicon-bonded hydrogen atoms per molecule.

Hydrosilylation Catalyst (C) is a 1,3-diethenyl-1,1,3,3-tetramethyldisiloxane platinum complex.

Flame Retardant Component (D) is aluminum hydroxide.

Flame Retardant Component (D') is also aluminum hydroxide but a different grade than that of Flame Retardant Component (D).

Flame Retardant Component (D") is magnesium hydroxide.

Reflective Component (E) is titanium dioxide.

Filler (F) is fumed silica.

Organopolysiloxane Polymer (G) is a vinyl-terminated polydimethylsiloxane.

Organopolysiloxane Polymer (G') is a different vinyl-terminated polydimethylsiloxane.

Each of the compositions of Examples 1-3 is disposed in a mold and cured to form a molded article. Physical properties of the molded articles formed from Examples 1-3 are determined and summarized below in Table 2.

TABLE 2

| | Example | | |
|---|---|---|---|
| Physical Property | 1 | 2 | 3 |
| Durometer (Shore A) | 74.4 | 75.9 | 83.3 |
| Tensile Strength (psi) | 989 | 679 | 1149 |
| Elongation (%) | 64 | 40 | 53 |
| Modulus (MPa) | 10.6 | 9.0 | 15.1 |
| Flammability $t_1$ (s) | 2 | 0 | 1 |
| Flammability $t_2$ (s) | 8 | 0 | 9 |
| ($t_1 + t_2$) (s) | 25 | 0 | 33 |
| Reflectivity (% at 480 nm) | 92.65 | 89.4 | 96 |

Flammability $t_1$, flammability $t_2$, and ($t_1+t_2$) are measured in accordance with UL 94 (vertical standard), which is a plastics flammability standard released by Underwriters Laboratories. In particular, under UL 94, five specimens of each of the molded articles are oriented vertically and subjected to an open flame. The specimens have dimensions of 125±5 mm×13.0±0.5 mm×3.0 mm. The average time required for each specimen to self extinguish, i.e., the flaming time, is reported as $t_1$. Each of the five specimens of each of the molded articles is then subjected to a second open flame, and the average total flaming and glowing time for each specimen is reported as $t_2$. ($t_1+t_2$) is the total flaming time for all five specimens of each molded article (i.e., $t_1$+the flaming time of $t_2$ for all five specimens of each Example). To achieve a V-0 rating in accordance with UL 94 (vertical standard), $t_1$ cannot exceed 10 seconds for any one specimen, $t_2$ cannot exceed 10 seconds for any one specimen, and ($t_1$+$t_2$) cannot exceed 50 seconds. Accordingly, the molded articles of Examples 1-3 achieve a V-0 rating in accordance with UL 94 (vertical standard), although generally such a rating must be independently confirmed, as readily understood in the art.

Comparative Examples 1-4

Compositions are prepared outside the scope of the subject disclosure. In particular, Table 3 below sets forth the components and relative amounts of each component of the compositions of Comparative Examples 1-4. Any percentages set forth below relate to weight percentages based on the total weight of each composition, but for the values reported for the hydrosilylation catalyst (C), which reflect parts per million (ppm) of platinum in the respective compositions.

TABLE 3

| Component | Comparative Example | | | |
|---|---|---|---|---|
| | 1 | 2 | 3 | 4 |
| Silicone Resin (A) | 9.95 | 9.95 | 9.95 | 12.43 |
| Organosilicon Compound (B) | 1.8 | 0 | 1.8 | 2.3 |
| Organosilicon Compound (B') | 0 | 1.8 | 0 | 0 |
| Hydrosilylation Catalyst (C) (ppm) | 1.3 | 2.6 | 1.3 | 1.6 |
| Flame Retardant Component (D) | 25 | 25 | 0 | 4.5 |
| Flame Retardant Component (D') | 0 | 0 | 0 | 0 |
| Flame Retardant Component (D") | 0 | 0 | 30 | 15.5 |
| Reflective Component (E) | 20 | 20 | 15 | 12.3 |
| Filler (F) | 7.22 | 7.22 | 7.22 | 9.05 |
| Organopolysiloxane Polymer (G) | 19.90 | 19.90 | 19.90 | 24.86 |
| Organopolysiloxane Polymer (G') | 10.83 | 10.83 | 10.83 | 13.58 |

Each of the compositions of Comparative Examples 1-4 is disposed in a mold and cured to form a molded article in conditions similar to Examples 1-3. Physical properties of the molded articles formed from Comparative Examples 1-4 are determined and summarized below in Table 4.

TABLE 4

| Physical Property | Comparative Example | | | |
|---|---|---|---|---|
| | 1 | 2 | 3 | 4 |
| Durometer (Shore A) | 75.5 | 79.6 | 70.1 | 87.0 |
| Tensile Strength (psi) | 773 | 882 | 721 | 797 |
| Elongation (%) | 53 | 33 | 71 | 87 |
| Modulus (MPa) | 10.1 | 10.0 | 7.0 | 6.3 |
| Flammability $t_1$ | 6 | 3 | 10 | 17 |
| Flammability $t_2$ | 12 | 12 | 20 | 45 |
| ($t_1$ + $t_2$) | 65 | 68 | 122 | 167 |
| Reflectivity (% at 480 nm) | 93.85 | 94.62 | 95.85 | 95.00 |

Importantly, Comparative Examples 1-4 are largely identical to Examples 1-3 but for the relative amounts of the Flame Retardant Component (i.e., Flame Retardant Components (D), (D'), and (D")) and the Reflective Component (E). Said differently, Comparative Examples 1-4 generally utilize the same silicone resin, organosilicon compound, and organopolysiloxane polymers as Examples 1-3. Notwithstanding the fact that Comparative Examples 1-4 are nearly identical to Examples 1-3 but for the relative amounts of the Flame Retardant Component (i.e., Flame Retardant Components (D), (D'), and (D")) and the Reflective Component (E), the physical properties of the molded articles of Comparative Examples 1-4 are significantly different than those of Examples 1-3.

For example, most notably, none of the molded articles of Comparative Examples 1-4 achieve a V-0 rating in accordance with UL 94 (vertical standard) for at least two different reasons. For example, relative to Comparative Examples 1 and 2, $t_2$ is greater than 10 seconds, and ($t_1$+$t_2$) is greater than 50 seconds. With respect to Comparative Example 3, $t_1$ is 10 seconds, $t_2$ was greater than 10 seconds, and ($t_1$+$t_2$) is 122 seconds, or more than twice that required to achieve a V-0 rating in accordance with UL 94 (vertical standard). Finally, relative to Comparative Example 4, $t_1$ was greater than 10 seconds, $t_2$ is more than 400% greater than the maximum value of 10 seconds required to achieve a V-0 rating in accordance with UL 94 at 45 seconds, and ($t_1$+$t_2$) is more than 300% greater than the maximum value of 50 seconds required to achieve a V-0 rating in accordance with UL 94 at 167 seconds. The undesirable flammability of the molded articles of Comparative Examples 1-4 is despite the similar loadings of the Flame Retardant Component in Comparative Examples 1-4 as Examples 1-3. Moreover, as noted above, these differences between Examples 1-3 and Comparative Examples 1-4 do not even account for additional differences that result from modifying the silicone resin, the organosilicon compound, and/or the organopolysiloxane polymers of the instant composition.

The invention has been described in an illustrative manner, and it is to be understood that the terminology which has been used is intended to be in the nature of words of description rather than of limitation. Obviously, many modifications and variations of the subject invention are possible in light of the above teachings. The invention may be practiced otherwise than as specifically described.

What is claimed is:
1. A hydrosilylation-curable silicone composition for forming an article, said composition comprising:
(A) a silicone resin comprising $R^1SiO_{3/2}$ units and/or $SiO_{4/2}$ units in combination with $R^1_3SiO_{1/2}$ units and/or $R^1_2SiO_{2/2}$ units, wherein $R^1$ is independently a substituted or unsubstituted $C_1$ to $C_{10}$ hydrocarbyl group free of aliphatic unsaturation, an alkenyl group, or a hydrogen atom, with the proviso that said silicone resin (A) includes at least two silicon-bonded alkenyl groups or at least two silicon-bonded hydrogen atoms per molecule, wherein the $R^1SiO_{3/2}$ units and/or $SiO_{4/2}$ units are present in at least 10 mol % based on all units in the silicone resin (A); (B) an organosilicon compound having an average of at least two silicon-bonded hydrogen atoms or at least two silicon-bonded alkenyl groups per molecule, with the proviso that when said silicone resin (A) includes silicon-bonded alkenyl groups, said organosilicon compound (B) includes at least two silicon-bonded hydrogen atoms per molecule, and when said silicone resin (A) includes silicon-bonded hydrogen atoms, said organosilicon compound (B) includes at least two silicon-bonded alkenyl groups per molecule;
(C) a hydrosilylation catalyst;
(D) a flame retardant component comprising aluminum hydroxide in an amount to provide at least 15 parts by weight of said aluminum hydroxide in said composition based on 100 parts by weight of said composition;
(E) a reflective component different from component (D) and comprising titanium dioxide in an amount to provide at least 2 and no more than 15 parts by weight of said titanium dioxide in said composition based on 100 parts by weight of said composition.

2. The composition of claim 1 further comprising one or both of (F) a filler different from components (D) and (E), and (G) a fluid organopolysiloxane polymer having at least two silicon-bonded alkenyl groups per molecule or at least two silicon-bonded hydrogen atoms per molecule.

3. The composition of claim 2 wherein component (G) is present in said composition in an amount of at least 20 parts by weight based on 100 parts by weight of said composition.

4. The composition of claim 2 wherein component (F) is a thermally conductive filler.

5. The composition of claim 4, wherein component (F) is selected from zinc oxide, boron nitride, and alumina.

6. The composition of claim 1 wherein said silicone resin (A) includes at least two silicon-bonded alkenyl groups per molecule and said organosilicon compound (B) includes at least two silicon-bonded hydrogen atoms per molecule.

7. The composition of claim 1 wherein component (D) further comprises magnesium hydroxide.

8. The composition of claim 7 wherein said magnesium hydroxide of component (D) is present in said composition in an amount of at least 5 parts by weight based on 100 parts by weight of said composition.

9. The composition of claim 1 wherein said aluminum hydroxide of component (D) is present in said composition in an amount of at least 20 parts by weight based on 100 parts by weight of said composition.

10. The composition of claim 1 wherein said titanium dioxide of component (E) is present in said composition in an amount of no more than 8 parts by weight based on 100 parts by weight of said composition.

11. A method of forming a molded article, said method comprising:
disposing the composition of claim 1 into a mold; and
curing the composition in the mold to form the molded article.

12. A hydrosilylation-curable silicone composition for forming an article, said composition comprising:
(A) a silicone resin comprising $R^1SiO_{3/2}$ units and/or $SiO_{4/2}$ units in combination with $R^1_3SiO_{1/2}$ units and/or $R^1_2SiO_{2/2}$ units, wherein $R^1$ is independently a substituted or unsubstituted $C_1$ to $C_{10}$ hydrocarbyl group free of aliphatic unsaturation, an alkenyl group, or a hydrogen atom, with the proviso that said silicone resin (A) includes at least two silicon-bonded alkenyl groups or at least two silicon-bonded hydrogen atoms per molecule;
(B) an organosilicon compound having an average of at least two silicon-bonded hydrogen atoms or at least two silicon-bonded alkenyl groups per molecule, with the proviso that when said silicone resin (A) includes silicon-bonded alkenyl groups, said organosilicon compound (B) includes at least two silicon-bonded hydrogen atoms per molecule, and when said silicone resin (A) includes silicon-bonded hydrogen atoms, said organosilicon compound (B) includes at least two silicon-bonded alkenyl groups per molecule;
(C) a hydrosilylation catalyst;
(D) a flame retardant component comprising aluminum hydroxide in an amount to provide at least 15 parts by weight of said aluminum hydroxide in said composition based on 100 parts by weight of said composition; and
(E) a reflective component different from component (D) and comprising titanium dioxide in an amount to provide at least 2 and no more than 15 parts by weight of said titanium dioxide in said composition based on 100 parts by weight of said composition,
wherein: said silicone resin (A) comprises an MQ resin or,
said organosilicon compound (B) comprises an MQ resin.

13. The composition of claim 12 further comprising (F) a filler different from components (D) and (E).

14. The composition of claim 12 wherein component (D) further comprises magnesium hydroxide.

15. The composition of claim 14 wherein said magnesium hydroxide of component (D) is present in said composition in an amount of at least 5 parts by weight based on 100 parts by weight of said composition.

16. The composition of claim 12 wherein said aluminum hydroxide of component (D) is present in said composition in an amount of at least 20 parts by weight based on 100 parts by weight of said composition.

17. The composition of claim 12 wherein said titanium dioxide of component (E) is present in said composition in an amount of no more than 8 parts by weight based on 100 parts by weight of said composition.

18. A method of forming a molded article, said method comprising:
disposing the composition of claim 12 into a mold; and
curing the composition in the mold to form the molded article.

19. A device comprising an article formed from a hydrosilylation-curable silicone composition comprising:
(A) a silicone resin comprising $R^1SiO_{3/2}$ units and/or $SiO_{4/2}$ units in combination with $R^1_3SiO_{1/2}$ units and/or $R^1_2SiO_{2/2}$ units, wherein $R^1$ is independently a substituted or unsubstituted $C_1$ to $C_{10}$ hydrocarbyl group free of aliphatic unsaturation, an alkenyl group, or a hydrogen atom, with the proviso that said silicone resin (A) includes at least two silicon-bonded alkenyl groups or at least two silicon-bonded hydrogen atoms per molecule;
(B) an organosilicon compound having an average of at least two silicon-bonded hydrogen atoms or at least two silicon-bonded alkenyl groups per molecule, with the proviso that when said silicone resin (A) includes silicon-bonded alkenyl groups, said organosilicon compound (B) includes at least two silicon-bonded hydrogen atoms per molecule, and when said silicone resin (A) includes silicon-bonded hydrogen atoms, said organosilicon compound (B) includes at least two silicon-bonded alkenyl groups per molecule;
(C) a hydrosilylation catalyst;
(D) a flame retardant component comprising aluminum hydroxide in an amount to provide at least 15 parts by weight of said aluminum hydroxide in said composition based on 100 parts by weight of said composition; and
(E) a reflective component different from component (D) and comprising titanium dioxide in an amount to provide at least 2 and no more than 15 parts by weight of said titanium dioxide in said composition based on 100 parts by weight of said composition,
wherein said device is selected from the group consisting of: a mixing chamber, a charged coupled device, and an optical device.

20. The device of claim 19, wherein the article achieves a V-0 flame-retardant classification at a thickness of 3 millimeters as measured in accordance with UL 94.

21. The device of claim 19, wherein the device is an optical device and wherein the optical device is selected from the group consisting of a lighting reflector, an LED housing, a light engine, a troffer, a lightguide, an optical camera, a photo-coupler, a light-sensing element, and a waveguide.

22. The device of claim 19, wherein the article has a reflectance of at least 90% at a thickness of 3 millimeters and in the wavelength range of 430-700 nanometers.

\* \* \* \* \*